(12) United States Patent
Refior et al.

(10) Patent No.: US 9,079,531 B2
(45) Date of Patent: Jul. 14, 2015

(54) STROBED HEADLIGHT FOR IMPROVED VISIBILITY

(71) Applicant: ARROW ELECTRONICS, INC., Englewood, CO (US)

(72) Inventors: Timothy Refior, Englewood, CO (US); Christian Curtis, Englewood, CO (US)

(73) Assignee: ARROW ELECTRONICS, INC., Englewood, CO (US)

( * ) Notice: Subject to any disclaimer, the term of this patent is extended or adjusted under 35 U.S.C. 154(b) by 0 days.

(21) Appl. No.: 14/096,097

(22) Filed: Dec. 4, 2013

(65) Prior Publication Data

US 2015/0151671 A1 Jun. 4, 2015

(51) Int. Cl.
*H05B 37/02* (2006.01)
*B60Q 1/14* (2006.01)
*H05B 33/08* (2006.01)

(52) U.S. Cl.
CPC .......... *B60Q 1/1423* (2013.01); *H05B 33/0854* (2013.01); *H05B 33/0872* (2013.01)

(58) Field of Classification Search
CPC .. B60Q 2300/41; B60Q 2300/42; B60Q 1/04; B60Q 1/085; B60Q 1/1423; B60Q 2300/312; B60Q 2300/314; F21S 48/10; F21S 48/215; H05B 33/0863; H05B 37/02; H05B 33/0842; H05B 33/0866; H05B 33/0872
USPC ............ 315/82, 77, 152, 247, 297, 291, 362; 362/231, 234, 276
See application file for complete search history.

(56) References Cited

U.S. PATENT DOCUMENTS

| 7,415,126 | B2 * | 8/2008 | Breed et al. | 382/100 |
| 8,100,552 | B2 * | 1/2012 | Spero | 362/231 |
| 8,564,205 | B2 * | 10/2013 | Roberts et al. | 315/82 |
| 2012/0206050 | A1 * | 8/2012 | Spero | 315/152 |

* cited by examiner

*Primary Examiner* — Vibol Tan
(74) *Attorney, Agent, or Firm* — Tutunjian & Bitetto, P.C.

(57) ABSTRACT

A light providing improved visibility during adverse conditions includes an array of discrete lights distributed over a surface. The discrete lights are configured to distribute directional light over a three-dimensional space. A regulation and multiplexing circuit is coupled to the array of discrete lights and configured to power discrete lights such that the regulation and multiplexing circuit strobes the discrete lights in accordance with environmental conditions to reduce or eliminate perceived streaking of precipitation or debris to improve operator visibility.

21 Claims, 7 Drawing Sheets

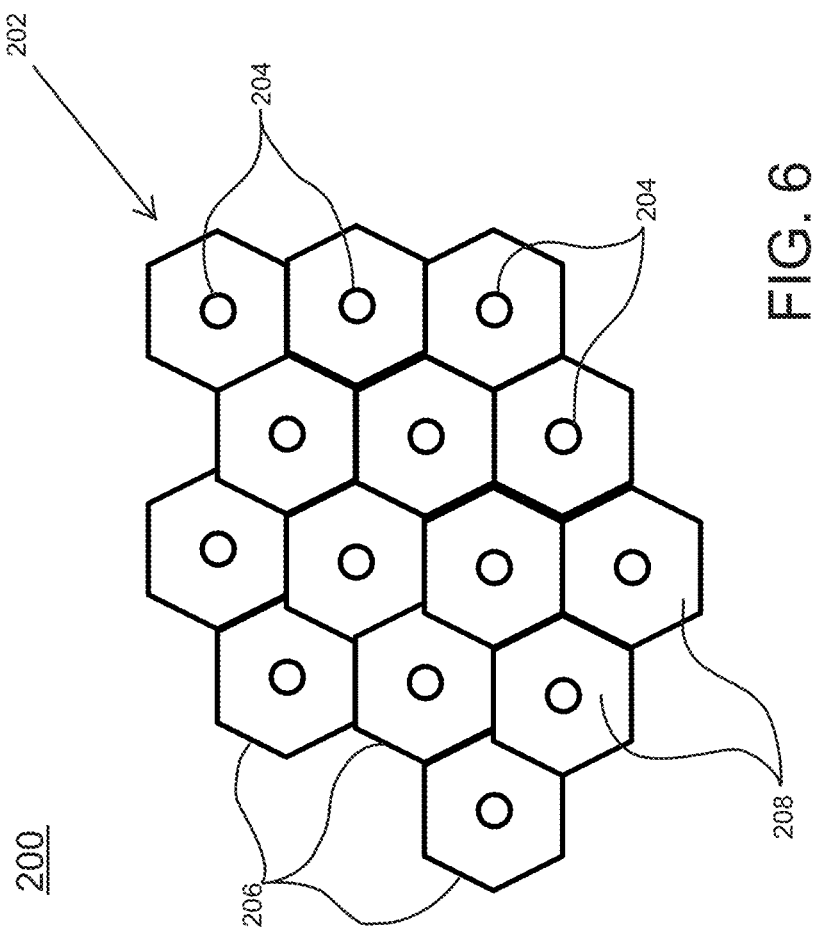

STROBED HEADLIGHT FOR IMPROVED VISIBILITY

BACKGROUND

1. Technical Field

The present invention relates to lighting devices, and more particularly to lighting devices and methods to improve visibility during debris fall, precipitation or adverse weather conditions.

2. Description of the Related Art

Dispersed light in adverse driving conditions, such as rain or snow, creates streaking as depicted in FIG. 1. Streaks, rather than single particles, are perceived by a viewer due to the relative speed of a particle in light, e.g., light from a headlight of a vehicle.

During inclement conditions, such as during rain or snow, visibility is greatly reduced due to dispersed light sources with reflectors. Attempts to improve visibility have included wipers for the headlights, fog lights, if available, and high beams, which can even further reduce visibility under many conditions.

SUMMARY

A light providing improved visibility during adverse conditions includes an array of discrete lights distributed over a surface. The discrete lights are configured to distribute directional light over a three-dimensional space. A regulation and multiplexing circuit is coupled to the array of discrete lights and configured to power discrete lights such that the regulation and multiplexing circuit strobes the discrete lights in accordance with environmental conditions to reduce or eliminate perceived streaking of precipitation or debris to improve operator visibility.

A strobing light system providing improved visibility during adverse conditions includes at least one light including an array of discrete lights distributed over a surface, the discrete lights being configured to distribute directional light over a three-dimensional space. A controller is responsive to an input to enable a lighting mode. A regulation and multiplexing circuit is coupled to the array of discrete lights and configured to power discrete lights in accordance with the lighting mode such that the regulation and multiplexing circuit strobes the discrete lights in accordance with environmental conditions to reduce or eliminate perceived streaking of precipitation or debris to improve operator visibility.

A method for improving visibility during adverse conditions includes providing at least one light including an array of discrete lights distributed over a surface, the discrete lights being configured to distribute directional light over a three-dimensional space; enabling a lighting mode in accordance with environmental conditions; and regulating energy to discrete lights in the array of discrete lights in accordance with the lighting mode and characteristic of the environmental conditions such that the discrete lights are strobed in a plurality of directions to reduce or eliminate perceived streaking of precipitation or debris to improve operator visibility.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a front view of an array of discrete lights in honey-comb cells to improve light directionality in accordance with one embodiment;

DETAILED DESCRIPTION OF PREFERRED EMBODIMENTS

Figure 1:
FIG. 1 is an image showing snow streaking through a vehicle windshield in accordance with prior art headlamps.

In accordance with the present principles, systems, apparatuses and methods are described, which provide strobing illumination to improve visibility during inclement weather conditions, such as rain, snow, fluid spray, etc. The present principles provide an ability to switch between modes of operation to adapt to different visibility conditions, e.g., illuminate in a first mode during snow and rain and differently during dry weather.

In a particularly useful embodiment, discreet light emission sources, such as e.g., light emitting diodes may be configured in an array. The entire array or portions thereof are configured to be strobed at a particular frequency to eliminate effects of fluid streaking on a windshield or other transparent viewing surface. Blurred images (streaking) are the effects of snow and rain falling in front of an automobile, day or night. Daytime streaking is caused by ambient light. Nighttime streaking is caused by the ambient light created by headlights or other external sources.

Utilizing a strobed light as a vehicle headlight creates a state of 'freezing' of the movement of water or other precipitation across the windshield. Each flash or pulse of energy provide greater unabated visibility with the foreground or paved road being visible through dots of snow and rain, rather than streaks. Streaks of snow or rain are the inherent by-product of the visual limitations of the human eye, e.g., a snowflake is only about a centimeter or so across and may appear as long as a meter or two to a driver. Thousands of snowflakes streaming in front of an automobile can result in extremely poor visibility.

Strobing the headlights of a vehicle would have inherent ill-effects of driver distraction in the vehicle with strobe lights and other vehicles (e.g., on-coming traffic). To remove the ill-effects of the strobe light to both the driver of the vehicle as well as all traffic on the road, mitigation may be achieved by a plurality of strategies. For example, a plurality or array of LEDs may be employed within the headlight. In one embodiment, each LED may be turned on and off (strobed) at regular intervals, with a certain percentage of LEDs within the fixture turned on at any given time. Hence, there is projected light in front of the vehicle at all times. A side effect of this scheme may include that ambient light is produced in areas which are intended to be void of light; hence, they can produce some streaking.

In another embodiment, streaking is remedied by the addition of directional lighting from each LED. In all automotive lighting, for example, reflectors have been used to capture, return, and project all light energy in a dispersed and fixed pattern to the road in front of the vehicle. It is this dispersion which causes a snow flake particle to be perceived as "a streamer" due to the reflection over the whole of an ambient light source such as a headlight. If all ambient aspects are removed and a single light point source is employed, the snow flake will pass through the light point source and become invisible in the surrounding darkness until lit by another light source. With multiple light point sources all or some of the light sources may be strobed and directionally oriented to reduce the effect of streaming while still providing sufficient light to operate a vehicle or to perform other activities.

In accordance with the present principles, a large array of LEDs is combined to illuminate an entire road at long distances using very directional LED lighting at a short distance. In one example, adjacent rows and columns of tubes with an LED recessed in each tube are provided. With even the simplest random non-uniform 'strobe' pattern, any given LED will illuminate a narrow point-to-point line (directional light) with very limited dispersed light effect. This is especially true at close proximity. During the same LED's off time, the effect at long distance is negligible as the surrounding LEDs fill in the 'voided' space with light. Vehicle movement also fills in voided space along the road way. Hence, a multitude of directional light sources, regardless of strobe pattern, will be perceived as a single uniform light source at long distances, while providing the necessary effects of a single strobe light at short range.

The short range visibility of dispersed light creates the streaming effect for falling precipitation. This causes poor long distance visibility while driving in adverse weather. Hence, reflectors intended to disperse light actually cause degraded visibility in many instances. Directional control of LED lights (or any other source or method of 'directional' light) permits the present principles to be applied. Because directionally strobed randomness will achieve better visibility than a conventional headlight, multiple strings of LEDs could be controlled in groups (series or parallel circuits) reducing system cost. Programmed patterns of strobing may be employed for different vehicle shapes and road speeds. For example, strobing all LEDs in a row starting at the bottom and rotating the strobe effect through to the top row may be advantageous for vehicles which sweep air flow over the hood of the vehicle, while rotating LED columns from the outside of a vehicle toward the inside most column may be advantageous for vehicles which push airflow to the sides of the vehicle (large trucks, etc.). Skipping adjacent rows and columns most likely has advantages as this minimizes ambient light 'wash over' into the foreground. Certainly any augmented visibility experienced by a driver increases vehicle safety.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the present invention will be described in terms of a given illustrative architecture; however, other architectures, structures, materials and process features and steps may be varied within the scope of the present invention.

It will also be understood that when an element is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
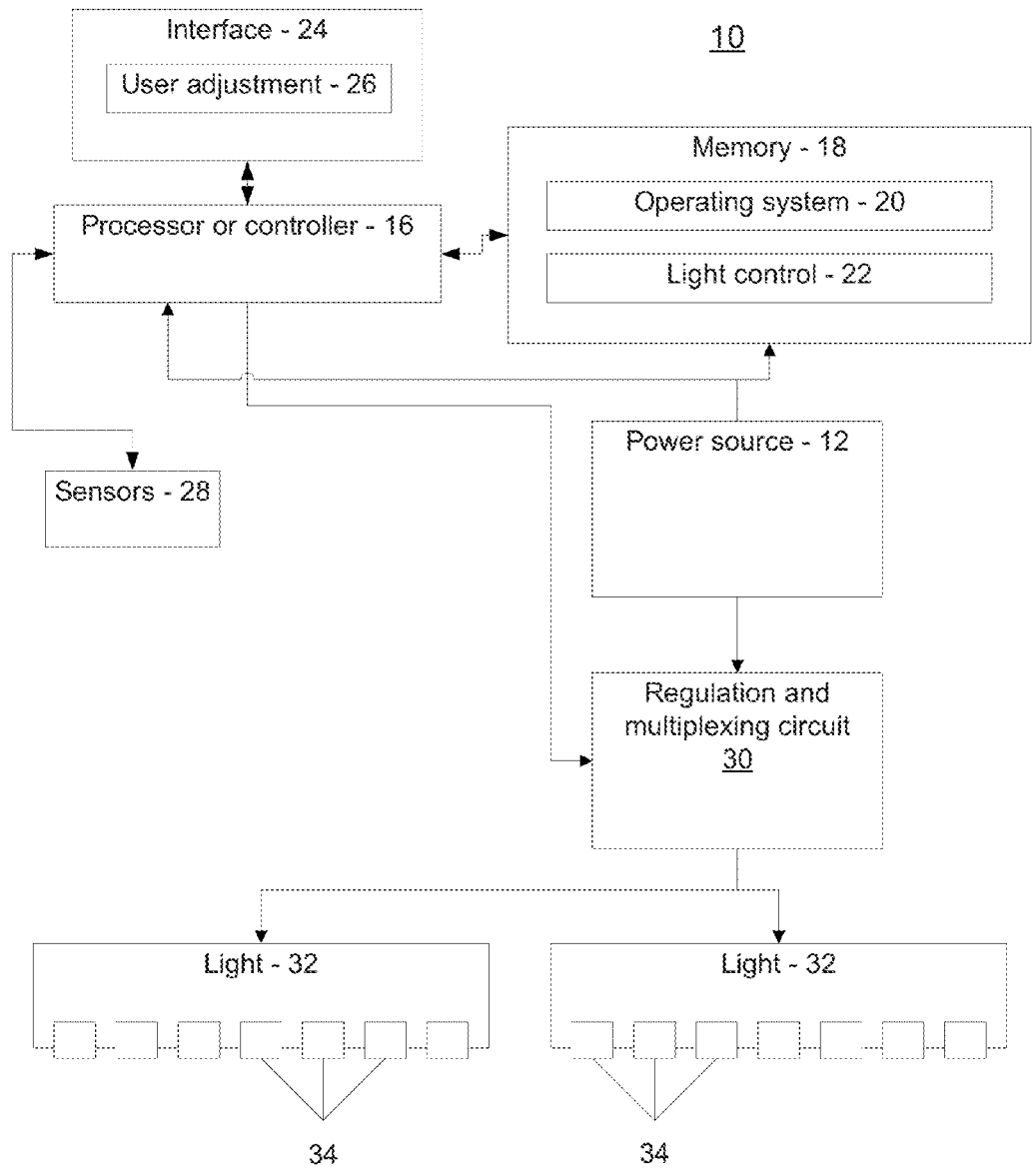
FIG. 2 is a block/flow diagram showing a strobing system for improving visibility during adverse conditions in accordance with the present principles.

Referring now to the drawings in which like numerals represent the same or similar elements and initially to FIG. 2, an illustrative strobing system 10 is shown in accordance with the present principles. The strobing system 10 includes a power source 12, which may include a battery or other stored electrical energy source. The power source 12 preferably includes a portable energy source that can be employed in moving vehicles. While the power source 12 preferably includes a direct current (DC) energy source, the power source 12 may also include an alternating current (AC) source. The power source 12 may provide energy to all portions of the system 10. The power source 12 may be part of a vehicle power system or may be any independent power source.

The power source 12 powers a processor or controller 16. In one embodiment, the processor 16 is hardwired to control a regulation and multiplexing circuit 30, in another embodiment, the processor 16 and memory 18 are employed to control the regulation and multiplexing circuit 30. In one embodiment, the memory 18 includes an operating system 20 configured to enable multiple functions and features for the system 10. Such features may include programming capabilities to make adjustments in a light control module 22. The light control module 22 provides a capability for adjustment of the regulation and multiplexing circuit 30 and can permit changes to duty cycle, strobe rate, number of light emitting diodes (LEDs) activated, pattern of LED activation, intensity of the LEDs, etc.

Adjustments to the regulation and multiplexing circuit 30 may be made manually by a user employing an interface 24. The interface 24 includes an adjustment mechanism 26, which may include a touchscreen display, a point and click mechanism on a display, buttons, knobs, or any other virtual or mechanical device. Adjustments to the regulation and multiplexing circuit 30 may be made automatically by employing a sensor or sensors 28. Sensors 28 may include photovoltaic devices, electrodes for detecting water, rainfall, snowflakes, fog, etc., which can be employed to detect precipitation or adverse conditions which may warrant a change to the regulation and multiplexing circuit 30. The regulation and multiplexing circuit 30 includes circuitry for regulating the power to each discrete light 34 and includes circuitry for multiplexing/selecting which discrete lights or lights 34 are lit.

In simpler embodiments, the sensor(s) 28 or interface 24 may be employed with the controller 16 to trigger the regulation and multiplexing circuit 30 directly. These simpler embodiments may include hardwired circuits for enabling one or more different lighting modes programmed (or hardwired) into the regulation and multiplexing circuit 30.

The regulation and multiplexing circuit 30 controls the pattern, intensity, duty cycle, strobe rate and any other electrical characteristics for powering one or more lights 32, and in particular discrete lights 34 arranged in an array. In particularly useful embodiments, the lights 32 and in particular the discrete lights 34 are controlled to provide better visibility during adverse conditions. The regulation and multiplexing circuit 30 controls the ability to adjust the hue of the discrete lights 34, either automatically or by the driver's personal choice, to optimize visibility given the immediate ambient light and weather conditions, dawn, dusk, snow, sleet, hail, rain, sea spray, fog, etc.

In one embodiment, the regulation and multiplexing circuit 30 is operated in different modes. One mode includes a daylight mode where the light 32 is turned on without strobing in high ambient (daylight) conditions. Another mode includes an off mode (no light). Another mode includes a strobing mode, which controls the strobing of the lights during adverse conditions. The strobing mode may include directional illumination with each light point source confined to specific boundaries, with turn on times being fractions of a second with specific turn off times. The whole of the system illuminates an intended area by light time averaging and long range ambient washing, while keeping short range lighting very directional. The strobing mode may be adjusted to the given conditions as described and may include sub-modes with different settings to accommodate, the type of precipitation or other relevant conditions, (e.g., amount of precipitation, angle of the precipitation, light conditions, etc.). In one embodiment, the strobing mode may be employed without directional lighting and only using the strobe effect to achieve better visibility.

While LEDs are preferable for discrete lights 34, other directional light sources may include multiple parabolic reflectors (with associated lights), light guiding pipes, narrow LED or light source beam angles, circular, square or other shaped pipes employed as directional light guides (e.g., a multi-sided honeycomb pattern seems to maximize LED density while allowing the cross sectional area for light to emanate from the point of the LED).

In one embodiment, the system 10 is employed in a motor vehicle to power the headlights. As a droplet or snowflake falls, the discrete lights 34 turn on and off at a periodic rate and duty cycle. When one or more discrete lights 34 are on, the droplet passing through a directional beam of the discrete light 34 reflects a small amount of the light. For conventional headlights, the parabolic beam headlights output a significant amount of light that results in glare that appears as streaking (FIG. 1). The longer the headlights are on, the longer the droplet appears to be. The droplet can be assumed to be invisible when the headlights are off.

In accordance with the present principles, the discrete lights 34 are strobed on and off at a particular rate and duty cycle configured to reduce the amount of glare due to streaking. As the discrete lights 34 are turned off and on for a single falling droplet falling through a conical cone of transmitted light, the droplet will appear as one or more discrete droplets (depending on the duty cycle, the cone size and the distance from the light 32) separated by a perceptible space. Now, the background is visible in the perceptible space between the droplets to improve visibility.

To maintain a minimum perceived level of illumination, the brightness of the discrete lights 34 should be dynamically adjusted in proportion to the strobe frequency and duty cycle. The strobed discrete lights 34 employed as a vehicle headlight create a perceived state of 'freezing' of the particles. Each flash or pulse of energy will inevitably create unabated visibility with the foreground or paved road being visible through dots of snow and rain, rather than streaks. Streaks of snow or rain are the inherent by-product of the limitations of our eyes. A snow flake, e.g., is only a centimeter or so across, yet it appears as a long stream or streak to a driver. Thousands of streaks in front of an automobile can result in extremely poor visibility.

Methods for strobing may also include Zenon or other light sources which can be turned on and off rapidly in milliseconds, rotating or oscillating covers, shudders or blades, electromechanical devices such as an LCD which allows light to pass or blocks light by 'flipping' pixels, etc.

It should be understood that the lights 32 described herein may be employed on boats, planes, bicycles, motorcycles, all-terrain vehicle (ATVs), flash lights, military vehicles, lighted helmets or applications or other environments in which particle objects move extremely fast and appear 'streaming' in dark environments. While utility may be found in lighted areas, the strobing effect in accordance with the present principles offers less of an advantage in lighted environments. The lights 34 may include a daytime running headlamp mode where strobing is not employed.

Figure 3:
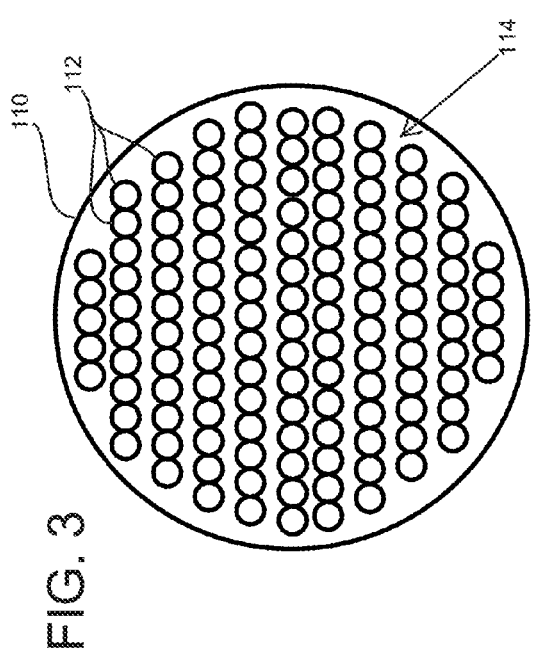
FIG. 3 is a front view of a round-shaped headlight having an array of discrete lights in accordance with one embodiment.

Referring to FIG. 3, a light source 110 is shown in accordance with one illustrative embodiment. The light source 110 includes a plurality of individual or discrete lights 112 (e.g., lights 34 in FIG. 1). The individual lights 112 are configured to provide directional light emission (beams) with decreased conical light dispersion. In a particularly useful embodiment, the individual lights 112 include light emitting diodes (LEDs) although other directional light sources may be employed. The light source 110 may include a bowed or staggered surface (see FIG. 4) to permit each light 112 or set of lights 112 to be directed in a different direction, such that an entire array 114 of lights 112 provides transmitted light to light up a conical volume. Alternately, the surface of the light source 110 may be flat, curved, stepped, etc., and the discrete lights 112 may be oriented in different directions. The array 114 of lights 112 is configured to provide or simulate a light cone emanating from the light source 112. In this way, the array 114 of lights 112 provides similar lighting coverage as conventional headlights or other lights which include parabolic or other reflector structures.

Figure 4:
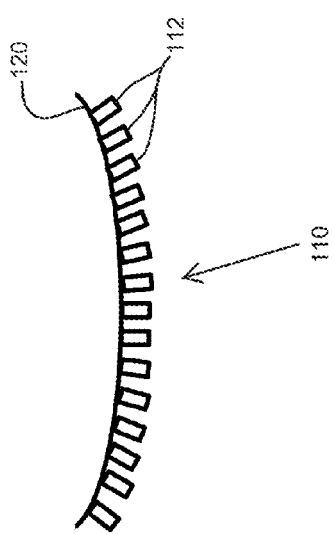
FIG. 4 is a cross-sectional view of a light showing a plurality of discrete light sources angled on a surface in accordance with one embodiment.

Referring to FIG. 4, in one embodiment, the light source 110 includes a surface 120 having LEDs 112 mounted therein. The LEDs 112 are angled relative to one another to provide directional light over a wider area. It should be understood that other structures may be provided to achieve wider transmission of directional light. Such structures may include a stepped design where LEDs are placed at different levels and light may be directed using a shade or reflective surface to spread out light as needed.

The curved surface 120 in FIG. 4 is preferably curved in three dimensions to provide a concave or convex three dimensional surface. In some embodiments, the curvature (or steps) may be along a horizontal or a vertical direction or other two dimensional direction.

Figure 5:
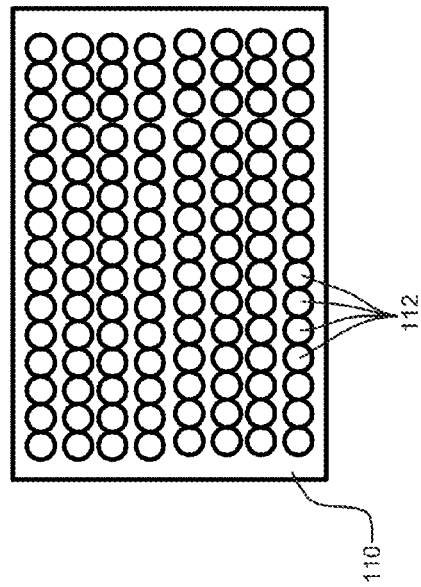
FIG. 5 is a front view of a rectangular-shaped headlight having an array of discrete lights in accordance with one embodiment.

Referring to FIG. 5, the shape of the light source 110 is no longer restricted to parabolic reflector shapes and may take on any shape. For example, a rectangular shape may be employed as depicted in FIG. 5. The light source 110 in FIG. 4 may also include a curved surface as described with respect to FIG. 4. Other shapes and configurations are also contemplated.

Referring to FIG. 6, an alternate embodiment shows a honeycomb pattern 202 that includes a discrete light 204 mounted in each cell 208. Walls 206 of the pattern 202 may be raised above the lights 204 to increase the directional nature of the light being emitted from the lights 204. The lights 202 or the honeycomb cells (walls) 208 (206) may be directed along different angular paths to provide a dispersed light output for a light source 200. As described, strobing lights produce dots as opposed to streaks thereby significantly improving visibility. Note that in a typical vehicle lighting scenario, a droplet falling at a sufficiently fast rate creates a blurred reflection resembling a streak. This is a phenomenon of the human eye where an image persists on the retina for approximately $1/25^{th}$ of a second, which effectively removes the space between droplets. A specific frequency of the falling droplets is matched by a strobe rate of a similar frequency to result in the illusion of suspended droplets.

Figure 7:
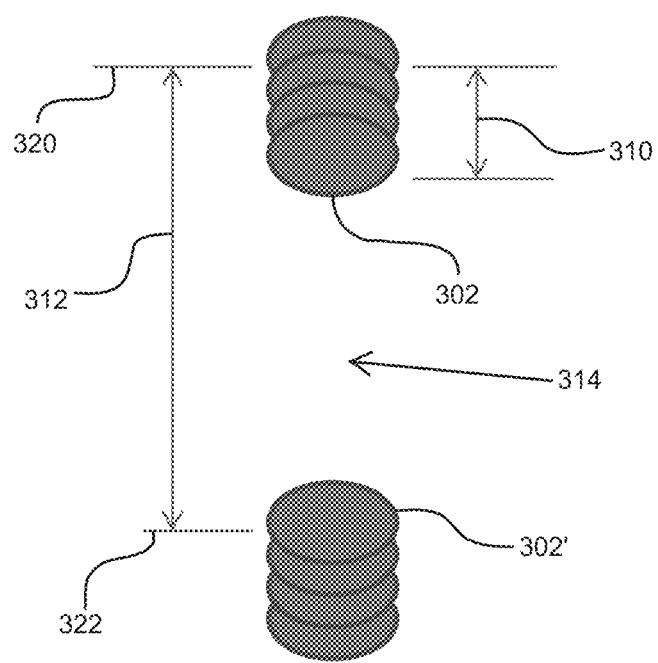
FIG. 7 is a diagram showing strobe timing relative to a falling droplet in accordance with the present principles.

Referring to FIG. 7, a perceived streaming effect of rain/snow droplets 302/304 which may or may not be periodic is illustratively shown. If perceived visible space 314 can be "created" between a single droplet moving between point 320 and point 322, viewing distance and clarity are enhanced as the driver can now see behind the would be streak. Creating this visible space can come from either modulating all or some of the lights (34, 112, 204, etc.) at a particular frequency and duty cycle. Modulating some of the lighting elements at different intervals creates a similar effect by altering the light pattern at a periodic or semi-periodic rate.

FIG. 7 depicts a scenario when a drop 302 is falling through the light emitted by a light source, e.g., 32, 110, etc., which preferably includes strobing combined with directional illumination. The drop 302 is illustrated twice through the light field; once at point 320 (drop 302) and once at point 322 (drop 302'). The strobe "pulse on time" duration combined with the drop speed determine a streamer length 310 perceived by a driver, pilot, cyclist, etc. The strobe frequency combined with drop speed determines a distance 314 of voided light in which no light is reflected back to the driver, pilot, cyclist, etc. By balancing the strobe frequency and the pulse duration (duty cycle), 'streamers' can be reduced or eliminated from the driver's visional path. Directional light paths including an LED array (or similar controlled arrangement from discrete directional lights) reduces or eliminates ambient light 'washout'. In addition, the perception of strobing by other drivers or traffic (oncoming cars, etc.) may be addressed by increasing the strobe rate beyond a perceptible refresh rate (e.g., 25-60 Hz) or redirecting the directed light paths so that the light paths do not affect on-lookers or other drivers. The directional discrete lights are aimed so that they fill in the entire intended lighting pattern in front of the vehicle (e.g., 20-70 degree cone angle).

While LED based lights are described, other incandescent, halogen, or other lighting technology may be employed. For example, strobing can be provided with Zenon lights (such as those employed in camera flashes), dispersed laser light (lowering light density to a safe level), mechanical devices, such as, e.g., a spinning fan blade or oscillating blade placed in front of the directional light sources, or even the electrical/mechanical closing of a liquid crystal display (LCD) panel, etc. LEDs are preferred due to their functionally convenient and economical features and their remarkable pulse tolerance combined with energy to light efficiency.

Figure 8:
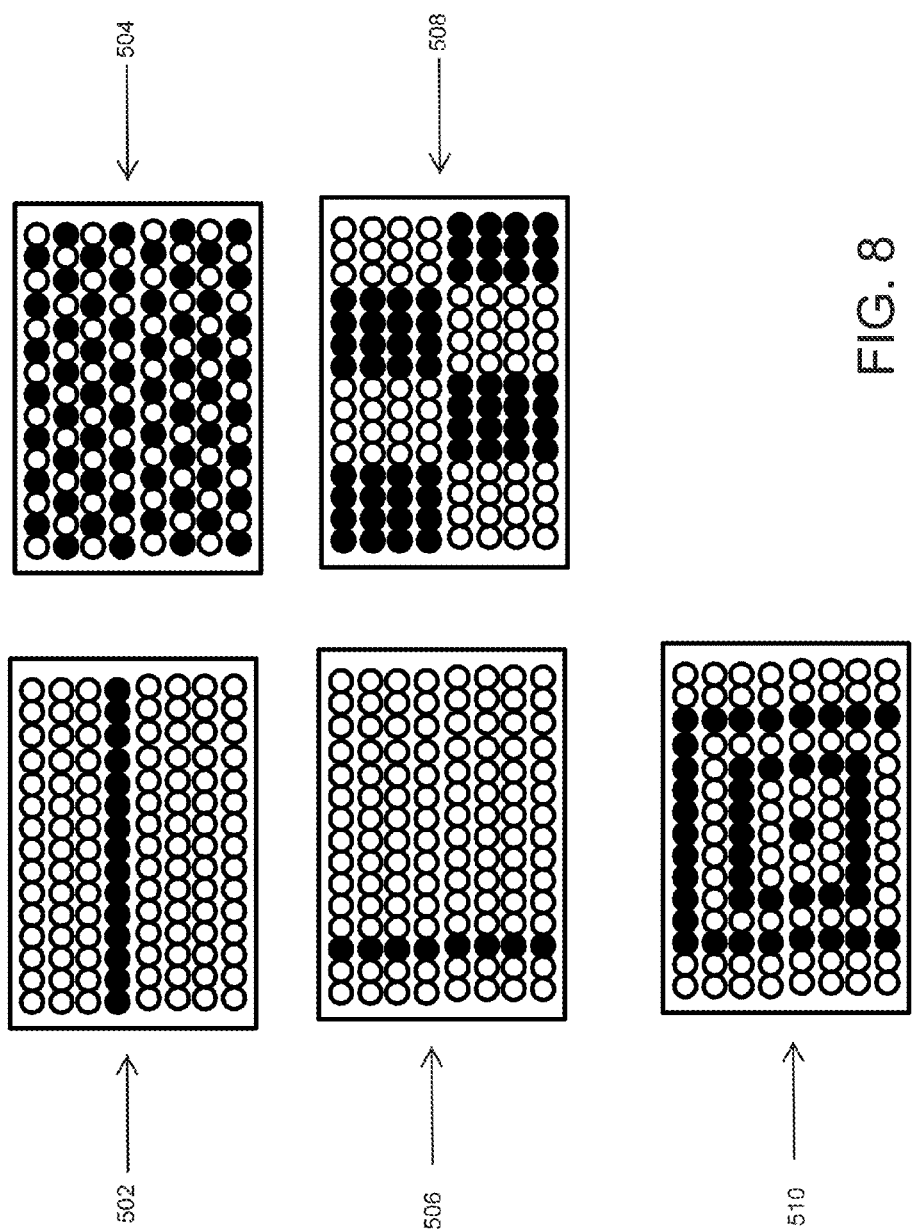
FIG. 8 is a diagram showing illustrative lighting patterns for a discrete light array in accordance with exemplary embodiments.

Referring to FIG. 8, a few illustrative and non-limiting strobing patterns are shown. The strobing patterns show darkened lights as lit LEDs or discrete lights at a particular instant during a strobing sequence. During a sequence for patterns 502 and 506, the rows or columns are selectively illuminated (the rows or columns being illuminated are moved to other LEDs over time with the set of rows or columns illuminated changing over time in accordance with a strobing frequency). The pattern 502 includes a bottom-to-top or top-to-bottom row or rows of LEDS or discrete lights being illuminated in accordance with the strobe frequency. The pattern 506 includes a side to side movement of lit LEDS or discrete lights with one or more columns being illuminated in accordance with a strobe frequency.

Patterns 504, 508 and 510 include different LED lighting patterns. The pattern 504 includes a checkerboard pattern where alternating sets of LEDS or discrete lights are illuminated in accordance with the strobe frequency. In one cycle, one set of LEDs are lit while a second set is not. In the next cycle, the second set is lit while the first set is not. The pattern 508 includes a checkerboard pattern with groups of alternating sets of LEDS or discrete lights, which are illuminated in accordance with the strobe frequency. The pattern 510 includes a bull's eye pattern with groups of alternating sets of LEDS or discrete lights are illuminated in accordance with the strobe frequency. Other patterns and shaped lenses are also contemplated with, e.g., random patterns, diagonal patterns, etc.

Highly directional lighting is preferred for light sources in accordance with the present principles. This permits the road or foreground to be lit at all times while turning off "slices" of the road/snow/rain. The off time slices that are not perceivable prevent streaking of snow/rain. Keeping LEDs "directional" prevents ambient illumination of "rain/snow" particles. This in turn prevents "streaking". Because a number of lights are on at any given time, the road or area ahead appears well lit over the whole of the system.

Figure 9:
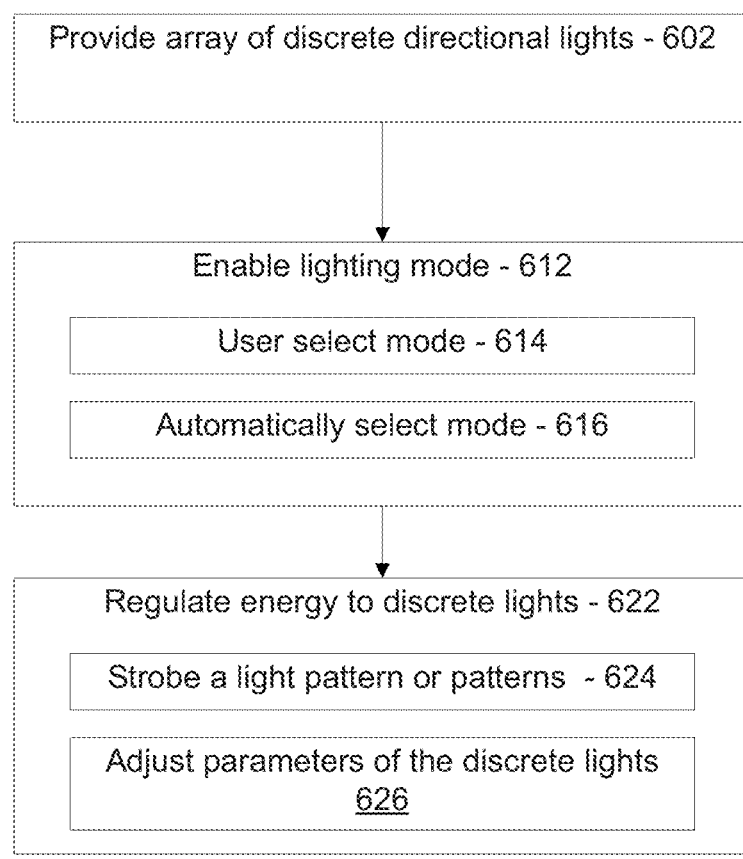
FIG. 9 is a block/flow diagram showing a method for improving visibility during adverse conditions in accordance with illustrative embodiments.

Referring to FIG. 9, a method for improving visibility during adverse conditions is illustratively shown. In block 602, at least one light is provided that includes an array of discrete lights distributed over a surface. The discrete lights are configured to distribute directional light over a three-dimensional space.

In block 612, a lighting mode is enabled in accordance with environmental conditions. Lighting modes may include a daytime mode, a nighttime mode, an adverse condition mode (and sub-modes of the adverse condition mode). A user may select the mode in block 614 or the mode may be selected automatically, in block 616, in accordance with a sensor or sensors that sense the adverse conditions, daytime and/or nighttime. An environmental condition may be sensed to enable the lighting mode, and the severity, type, or characteristics of the environmental condition may also be determined using sensors.

In block 622, energy is regulated to selected discrete lights in the array of discrete lights in accordance with the lighting mode, characteristics or the environmental conditions. The discrete lights are strobed in a plurality of directions to reduce or eliminate perceived streaking of precipitation or debris to improve operator visibility. In particularly useful embodiments, the directionality and strobing of all or less than all of the lights reduces reflected light off of the precipitation or debris that may be present during the adverse conditions.

In block 624, the discrete lights may include light emitting diodes or other discrete lights arranged at different angles across the array and wherein regulating the lights may include strobing a pattern of discrete lights such that all or less than all of the discrete lights are lit during a single instant. Light is still supplied and may even be intensified in the lit lights to ensure that the road or other background is illuminated.

In block 626, regulation of the discrete lights may include adjusting one or more parameters including, e.g., hue, duty cycle, pulse rate, intensity, color, enablement in accordance with one of the environmental condition and user preference.

Other regulation features may include cycling the power to the lights to create a sinusoidal or other intensity pattern, adjusting the duty cycle or strobe rate in accordance with the rate of precipitation or ambient light conditions, adjusting the strobe rate to prevent distraction to other drivers, adjusting the duty cycle or strobe rate in accordance with the speed of the vehicle; adjusting the light pattern in accordance with the rate of precipitation, the speed of the vehicle, ambient light conditions, etc.

Having described preferred embodiments for strobed headlight for improved visibility (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A light providing improved visibility during adverse conditions, comprising:
    an array of discrete lights distributed over a surface, the discrete lights being configured to distribute directional light over a three-dimensional space; and
    a regulation and multiplexing circuit coupled to the array of discrete lights and configured to power discrete lights such that the regulation and multiplexing circuit strobes the discrete lights in accordance with environmental conditions including a rate of precipitation or debris falling to reduce or eliminate perceived streaking of reflected light due to precipitation or debris to improve operator visibility.

2. The light as recited in claim 1, wherein the discrete lights include light emitting diodes arranged at different angles across the array.

3. The light as recited in claim 1, wherein the regulation and multiplexing circuit strobes a pattern wherein less than all of the discrete lights are lit during a single instant.

4. The light as recited in claim 1, further comprising a sensor configured to enable the regulation and multiplexing circuit during an environmental condition.

5. The light as recited in claim 4, wherein the regulation and multiplexing circuit is adjusted in accordance with the environmental condition.

6. The light as recited in claim 1, further comprising a user interface configured to adjust the regulation and multiplexing circuit.

7. The light as recited in claim 1, wherein the regulation and multiplexing circuit controls at least one of hue, duty cycle, pulse rate, and enablement of the discrete lights.

8. The light as recited in claim 1, wherein the surface is configured to provide distributed angles for the discrete lights.

9. The light as recited in claim 1, wherein the light includes one of a headlight and a flash light.

10. A strobing light system providing improved visibility during adverse conditions, comprising:
    at least one light including an array of discrete lights distributed over a surface, the discrete lights being configured to distribute directional light over a three-dimensional space;
    a controller responsive to an input to enable a lighting mode; and
    a regulation and multiplexing circuit coupled to the array of discrete lights and configured to power discrete lights in accordance with the lighting mode such that the regulation and multiplexing circuit strobes the discrete lights in accordance with environmental conditions including a rate of precipitation or debris falling to reduce or eliminate perceived streaking of reflected light due to precipitation or debris to improve operator visibility.

11. The light as recited in claim 10, wherein the discrete lights include light emitting diodes arranged at different angles across the array.

12. The light as recited in claim 10, wherein the regulation and multiplexing circuit strobes a pattern wherein less than all of the discrete lights are lit during a single instant.

13. The light as recited in claim 10, further comprising a sensor configured to enable the regulation and multiplexing circuit during an environmental condition.

14. The light as recited in claim 13, wherein the regulation and multiplexing circuit is adjusted in accordance with the environmental condition.

15. The light as recited in claim 10, further comprising a user interface configured to adjust the regulation and multiplexing circuit.

16. The light as recited in claim 10, wherein the regulation and multiplexing circuit controls at least one of hue, duty cycle, pulse rate, and enablement of the discrete lights.

17. The light as recited in claim 10, wherein the surface is configured to provide distributed angles for the discrete lights.

18. A method for improving visibility during adverse conditions, comprising:
    providing at least one light including an array of discrete lights distributed over a surface, the discrete lights being configured to distribute directional light over a three-dimensional space;
    enabling a lighting mode in accordance with environmental conditions; and
    regulating energy to discrete lights in the array of discrete lights in accordance with the lighting mode and characteristic of the environmental conditions including a rate of precipitation or debris falling such that the discrete lights are strobed in a plurality of directions to reduce or eliminate perceived streaking of reflected light due to precipitation or debris to improve operator visibility.

19. The method as recited in claim 18, wherein the discrete lights include light emitting diodes arranged at different angles across the array and wherein regulating includes strobing a pattern of discrete lights wherein less than all of the discrete lights are lit during a single instant.

20. The method as recited in claim 18, wherein enabling a lighting mode includes sensing an environmental condition to enable the lighting mode.

21. The method as recited in claim 18, wherein regulating includes adjusting one or more of hue, duty cycle, pulse rate, and enablement of the discrete lights in accordance with one of the environmental condition and user preference.

* * * * *